United States Patent [19]

Zangenehpour

[11] Patent Number: 6,038,641
[45] Date of Patent: Mar. 14, 2000

[54] TWO STAGE CACHE MEMORY SYSTEM AND METHOD

[75] Inventor: Saied Zangenehpour, Stevensville, Mich.

[73] Assignee: Packard Bell NEC, Sacramento, Calif.

[21] Appl. No.: 08/131,029

[22] Filed: Oct. 4, 1993

Related U.S. Application Data

[63] Continuation of application No. 07/918,892, Jul. 16, 1992, abandoned, which is a continuation of application No. 07/657,969, Feb. 20, 1991, abandoned, which is a continuation of application No. 07/292,189, Dec. 30, 1988, abandoned.

[51] Int. Cl.[7] .................................................. G06F 12/00
[52] U.S. Cl. ............................................................ 711/119
[58] Field of Search ............................................. 711/119

[56] References Cited

U.S. PATENT DOCUMENTS

| 4,020,466 | 4/1977 | Cordi et al. . | |
| 4,032,899 | 6/1977 | Jenny | 364/DIG. 1 |
| 4,048,625 | 9/1977 | Harris | 364/DIG. 2 |
| 4,181,937 | 1/1980 | Hattori et al. | 364/200 |
| 4,268,907 | 5/1981 | Porter et al. | 364/200 |
| 4,298,929 | 11/1981 | Capozzi | 364/200 |
| 4,409,656 | 10/1983 | Andersen et al. | 364/200 |
| 4,464,712 | 8/1984 | Fletcher | 364/200 |
| 4,476,526 | 10/1984 | Dodd . | |
| 4,551,799 | 11/1985 | Ryan et al. . | |
| 4,780,808 | 10/1988 | Moreno et al. | 364/200 |
| 4,833,601 | 5/1989 | Barlow et al. | 364/200 |
| 4,858,111 | 8/1989 | Steps | 364/200 |
| 4,872,111 | 10/1989 | Daberkow | 364/200 |

*Primary Examiner*—David Y. Eng
*Attorney, Agent, or Firm*—Fitch, Even, Tabin & Flannery

[57] ABSTRACT

A cache memory is divided into two parts, a master cache memory and a slave cache memory. The slave cache memory receives data from a slow source and then sends it quickly to the master cache memory so that the master cache memory is occupied less of the time with reading or writing data to or from a mass-storage or other peripheral device and is available more of the time for reading or writing data to or from main memory and responding to CPU requests.

9 Claims, 3 Drawing Sheets

TWO STAGE CACHE MEMORY SYSTEM AND METHOD

The instant application is a continuation of application Ser. No. 07/918,892, now abandoned, filed on Jul. 16, 1992, which is a continuation of application Ser. No. 07/657,969, now abandoned, filed on Feb. 20, 1991, which is a continuation of application Ser. No. 07/292,189, now abandoned, filed on Dec. 30, 1988.

FIELD OF THE INVENTION

The invention is related to cache memories for peripheral interfaces especially mass-storage controllers. More specifically the invention relates to an apparatuses and method for increasing the efficiency of cache memories for mass-storage controllers.

CROSS REFERENCE TO RELATED APPLICATIONS

This application is related to but in no way dependent on "Method and Apparatus for Replacing Data in a Cache Memory", Ser. No. 07/295,579, filed Dec. 30, 1988 and "Dynamic Prefetching for a Cache Memory", Ser. No, 07/345,915, filed May 1, 1989, of common ownership and inventorship herewith.

BACKGROUND OF THE INVENTION

Information or data can be stored relatively inexpensively in various magnetic or optical mass-storage devices such as tapes, disks or drums. These devices are slow, non-volatile, and only provide for access to large blocks of data. Silicon-based random access memory (RAM) is significantly faster, provides for random byte-by-byte access to data, but is volatile, and more expensive. The difference in speed is often several orders of magnitude.

It is therefore common practice in the computer industry to mass-store data in magnetic or optical mass-storage devices, transfer the data to RAM for use or modification, and then transfer the data back to mass-storage devices.

Due to the speed difference between RAM and mass-storage devices, a computer process is significantly delayed when more data is needed from a mass-storage device. Several methods are used to minimize such delays.

One common approach is the use of a cache memory. Such a memory is usually silicon based and part of the mass-storage controller. When the computer requests data from the mass-storage device, the requested data is fetched from the mass-storage device along with a prefetch of more data than requested. The prefetched data is loaded into the cache memory (located in the mass-storage controller) in hopes that the data that is subsequently requested will already be in the cache memory. The requested data is also retained assuming that it is likely to be used again. Each subsequent request for data is checked first against the cache memory before it is fetched from the mass-storage device. Data that is already in the cache memory can be supplied to the computer much faster than data that must be fetched from a mass-storage device.

Dynamic RAM memory can only accept data (write) or give data (read) at a given time. It is therefore important that the cache memory be able to read and write as quickly as possible so it is available for other requests. The cache memory spends a majority of its time in communication with mass-storage devices because mass-storage devices are so much slower than RAM.

Prior art: U.S. Pat. No. 4,181,937—Hattori et al., "Data Processing System Having an Intermediate Buffer Memory"; U.S. Pat. No. 4,268,907—Porter et al., "Cache Unit Bypass Apparatus"; U.S. Pat. No. 4,298,929—Capozzi, "Integrated Multilevel Storage Hierarchy for a Data Processing System with Improved Channel to Memory Write Capability"; and U.S. Pat. No. 4,464,712—Fletcher, "Second Level Cache replacement Method and Apparatus".

OBJECTS OF THE INVENTION

It is the object of this invention to provide a peripheral interface cache memory with improved performance.

It is another object of this invention to provide a mass-storage controller cache memory with improved performance.

It is another object of the invention to decrease the time required to write data into a cache memory so the cache memory is available more of the time to read data out.

It is another object of this invention to provide a mass-storage controller that improves the response time of mass-storage requests.

BRIEF DESCRIPTION OF THE DRAWINGS

Preferred embodiments demonstrating the various objectives and features of the invention will now be described in conjunction with the following drawings.

DETAILED DESCRIPTION OF THE PREFERRED EMBODIMENTS OF THE INVENTION

Figure 1:
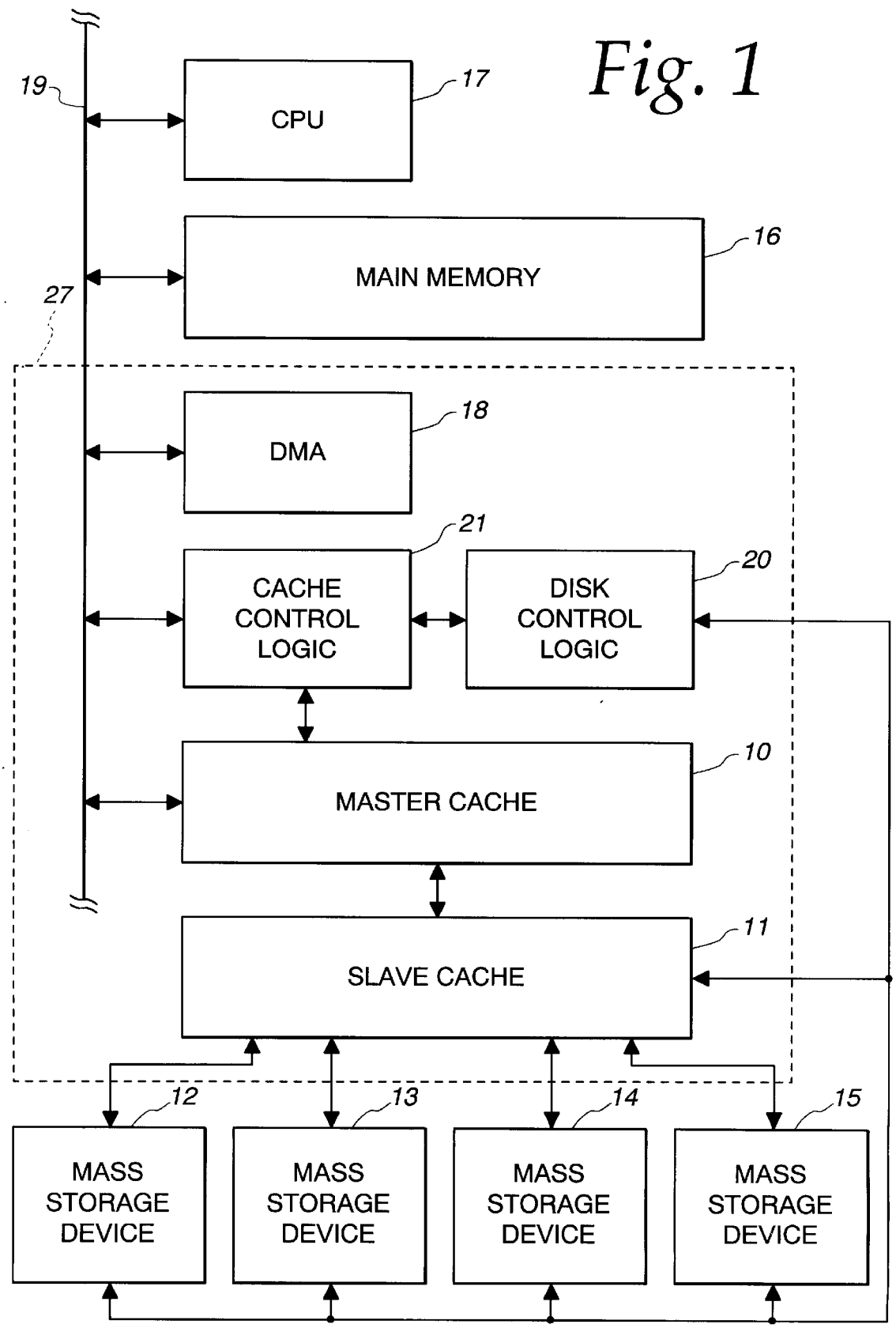
FIG. 1 is a block diagram of a computer implementing the preferred embodiment of the invention showing the major components and their interconnection.

Referring to FIG. 1, the present invention addresses the problem of increasing the availability of the cache memory to requests for data by dividing the cache memory into a "master" cache memory 10 and a "slave" cache memory 11. Data is transferred from a mass-storage device 12, 13, 14, or 15 to slave cache memory 11 and then from slave cache memory 11 to the master cache memory 10. The time required to write data to master cache memory 10 is governed by the time required to read that same data from slave cache memory 11 and not the time required to read that same data from the much slower mass-storage devices 12, 13, 14 and 15. The access time required to receive data from the a mass storage device is often an order of magnitude or more greater than the time required to receive that same data from the slave cache memory. Therefore, master cache memory 10 spends much less time reading data from the slave cache memory 11 than it would reading data directly from a mass-storage device 12, 13, 14 or 15 and is available far more often for serving requests for data.

The mass-storage devices can be any number of devices; the four shown are only intended as an example. Typical mass-storage devices include disks, tapes, or drums with information stored in magnetic or optical form. The principles of the invention apply equally regardless of the form of mass storage.

A request to move data from a mass-storage devices 12, 13, 14 or 15 to main memory 16 is initiated by the central processing unit (CPU) 17. It is sent by the CPU 17 or the direct memory access controller (DMA) 18 over bus 19 to mass-storage control logic 20. However, the cache memory control logic 21 intercepts the request and checks the master cache memory 10 for the requested data. If the requested data is in the master cache memory it is transferred over bus 19 to main memory 16. If the data is not in the master cache memory 10, the request is passed along to mass-storage control logic 20. Mass-storage control logic 20 determines which mass-storage device contains the requested data and where on that device the data resides. The requested data is sent from the mass-storage device to slave cache memory 11.

Slave cache memory 11 collects the requested data from the mass-storage device at a slower speed determined by the mass storage device. The master cache memory 10 then reads the data from the slave cache memory 11 at a much higher speed. The requested data is then sent from master cache memory 10 to main memory 16 via bus 19. Writing to the a mass-storage device is handled in much the same way. Data is read from main memory 16 and written to master cache memory 10. The master cache memory keeps the data and reads a copy to the slave cache memory 11. The slave cache memory 11 in turn reads the data to a selected mass-storage device. If a write request is received for data which is already in the master cache memory it is overwritten in the master cache memory by a copy from the main memory. It is then written to the slave cache memory which in turn writes it to a mass-storage device.

The mass-storage control logic 20 and the cache memory control logic 21 act in concert to control the flow of data. When the CPU 17 or DMA controller 18 request data from a mass-storage device 12, 13, 14, or 15, it sends a request to the mass-storage control logic 20. It has no "knowledge" of the cache memory, nor does it need any knowledge of the cache memory.

The mass-storage devices 12, 13, 14 and 15 respond to requests the same as they would in any non-cache memory system. The invention can be implemented by adding cache memory control logic 21, mass-storage control logic 20, master cache memory 10, and slave cache memory 11 to any computer. No other logic must be changed to implement the invention. In an open architecture system this can be done by plugging in a circuit board to a pre-existing system, however, a typical system would be a mass-storage controller 27 which would also include the DMA 18.

Figure 2:
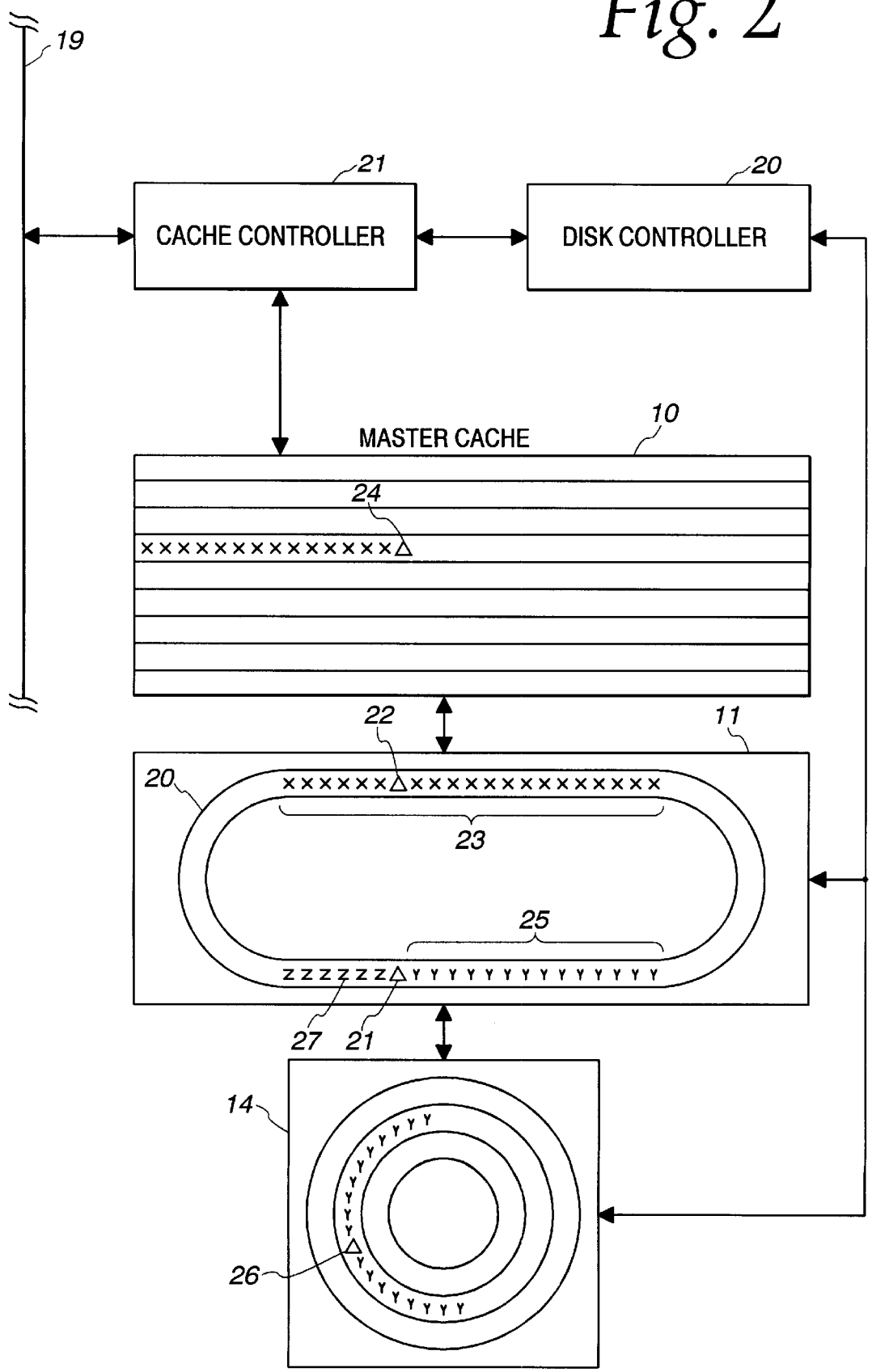
FIG. 2 is a more detailed diagram of a section of FIG. 1 showing an example of the data transfer process.

Referring to FIG. 2, the slave cache memory 11 is dual-ported static RAM which acts as a speed adjustment buffer. Good examples of this kind of RAM are CY7C130, CY7C140, CY7C132, and CY7C140 produced by Cypress Semiconductor of San Jose, Calif. The slave cache memory 11 is logically organized as a circular queue 20; data is read out in the same order that it is written in. A write pointer 21 moves through the memory, writing data from either the master cache memory 10 or one of the mass-storage devices 12, 13, 14 and 15. A read pointer 22 follows the write pointer through the memory reading data to the master cache memory or a mass storage device. Both pointers move at different rates synchronized with the data transfer rate of the mass-storage devices or the data transfer rate of the master cache memory.

The slave cache memory 11 should be at least twice the size of one sector of data from the mass-storage devices. A sector is the smallest unit of data that the a mass-storage can address. A sector must be completely written to the slave cache memory 11 before it can be read out. If the slave cache memory 11 holds the equivalent of two sectors of memory it can write one sector from the a mass-storage device and read one sector to the master cache memory at the same time.

In the example illustrated in FIG. 2, sector X 23 is being read from the slave cache memory 11 at read pointer 22 and written to master cache memory 10 at write pointer 24. Sector Y 25 is also being read from mass-storage device 14 at read head 26 and written to slave cache memory 11 at write pointer 21. A part of sector Z 27 remains and is being over written by sector Y 25. In this example read pointer 22 would be moving at the high speed of master cache memory 12 and write pointer 21 would be moving at the slower speed of mass-storage device 14.

DESCRIPTION OF SOME ALTERNATE EMBODIMENTS

Cache memories are used in several applications in the computer art. The improvements described here are equally applicable to any form of peripheral interface cache memory. Any time there is a significant difference in speed between two forms of stored data, cache memories and the present invention can be beneficial.

The slave cache memory need not be dual-ported static RAM. Dual-ported static RAM provides the best performance, but at a high price. Single-ported RAM would provide slightly less performance at a considerable savings. Time sharing control needs to be added if single-ported RAM is used so both the mass-storage device and master cache memory have equal access to the slave cache memory.

A series of registers can also be used for the slave cache memory with much the same effect as the single-ported RAM. Time sharing controls would be needed and it would be slower but less expensive.

The preferred embodiment also discloses cache memories as part of the a mass-storage controller. The physical layout of the circuits is not important. The cache memories may also be mounted out side the cache memory controller but provide the same function.

Figure 3:
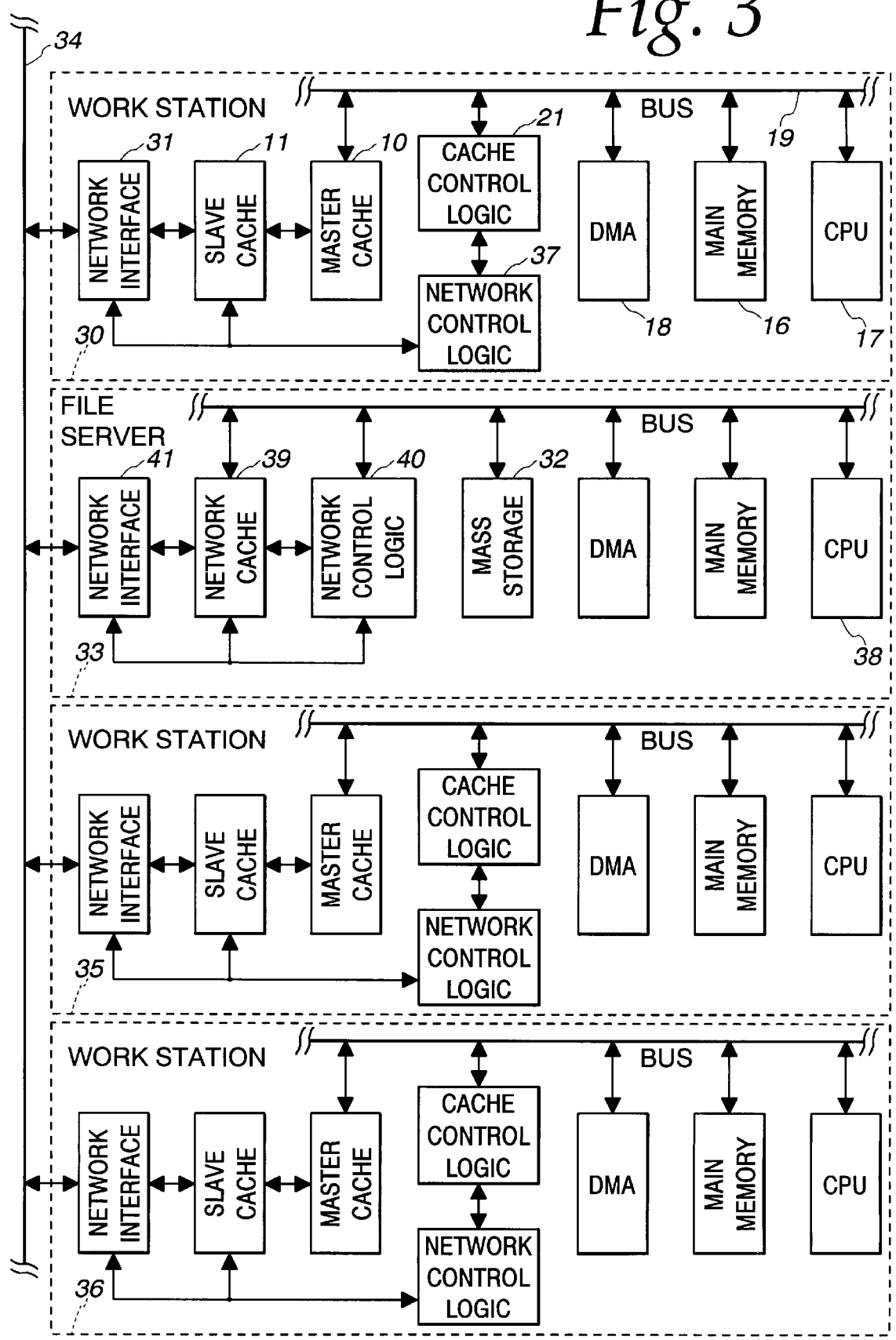
FIG. 3 is a block diagram of a computer network implementing an alternate embodiment of the invention.

FIG. 3 demonstrates how to apply the invention to a network file system. Work station 30 very closely resembles FIG. 1. However, the mass-storage devices are replaced with a network interface 31. Mass storage is provided in a central file server 33 through a network 34. The file server also provides mass storage for workstations 35 and 36. The invention would be applied to work stations 30, 35, and 36 in the same manner so only workstation 30 will be described. This configuration is merely demonstrative; any combination of file servers and work stations would be equally applicable.

A request to move data from mass-storage device 32 to main memory 16 is initiated by the central processing unit (CPU) 17. It is sent by the CPU 17 or the direct memory access controller (DMA) 18 over bus 19 to network control logic 37. However, the cache memory control logic 21 intercepts the request and checks the master cache memory 10 for the requested data. If the requested data is in the master cache memory it is transferred over bus 19 to main memory 16. If the data is not in the master cache memory 10, the request is passed along to network control logic 37. Network control logic 37 in turn requests the data from file server 33 over network 34. The file server CPU 38 receives the request and sends the requested data to network cache memory 39. Under control of the file server network control logic 40, the data is sent through the file server network interface 41, network 34 and network interface 31 to slave cache memory 11.

Slave cache memory 11 collects the requested data from network interface 31 at a slower speed determined by the network. The master cache memory 10 then reads the data from the slave cache memory 11 at a much higher speed. The requested data is then sent from master cache memory 10 to main memory 16 via bus 19.

Writing to mass-storage device 32 is handled in much the same way. Data is read from main memory 16 and written to master cache memory 10. The master cache memory keeps the data and reads a copy to the slave cache memory 11. The slave cache memory 11 in turn reads the data to network interface 31 and through the network to mass-storage device 32. If a write request is received for data which is already in the master cache memory it is overwritten in the master cache memory by a copy from the main memory. It is then written to the slave cache memory which in turn sends the data back through the network the mass-storage device 32.

Although described above in terms of a few embodiments the present invention is set forth with particularity in the appended claims. Such modifications and alterations as would be apparent to one of ordinary skill in the art and familiar with the teachings of this application shall be deemed to fall within the spirit and scope of the invention.

I claim:

1. In a computer system including a main memory, a central processing unit (CPU), a buffer, a cache memory and one or more mass storage devices, said CPU, main memory and said cache memory being connected to a common bus, said buffer being connected between said cache memory and said one or more mass storage devices, a method of transferring data requested by said CPU between said one or more mass storage devices and said main memory, the method comprising the steps of:

determining whether said requested data is within said cache memory;

transferring a predetermined amount of said requested data from said mass storage device to said buffer when said requested data is not within said cache memory;

transferring a portion of said predetermined amount of said requested data from said buffer to said cache memory while said predetermined amount of said requested data is being transferred from said mass storage device to said buffer; and transferring a predetermined portion of said requested data from said cache memory to said main memory while said predetermined amount of said requested data is being transferred from said mass storage device to said buffer.

2. A cache memory system for a computer which includes a central processing unit (CPU), and a direct memory access (DMA) controller, a main memory and one or more mass storage devices for servicing data requests from said CPU or said DMA controller, said cache memory system comprising:

means for buffering data, said buffering means having a predetermined amount of memory storage space, said buffering means operatively coupled between a cache memory and said one or more mass storage devices;

a common bus;

means for operatively coupling said CPU and said main memory to said common bus;

a cache memory, operatively coupled to said common bus, said cache memory also operatively coupled to said buffering means;

means for controlling data transfers in response to said data requests between said buffering means and said one or more mass storage devices; between said buffering means and said cache memory; and between said cache memory and said main memory, including means for determining whether the requested data is within said cache memory;

means responsive to said determining means for transferring the requested data between said mass storage device and said buffering means when said requested data is not within said cache memory;

means for transferring at least a portion of the requested data between said buffering means and said cache memory while said requested data is being transferred between said mass storage device and said buffering means; and means for transferring at least a portion of the requested data between said cache memory and said main memory while a portion of said requested data is being transferred between said mass storage device and said buffering means.

3. A cache memory system as recited in claim 2, wherein said buffer is a first in-first out (FIFO) buffer.

4. A cache memory system as recited in claim 2, wherein said buffer includes random access memory.

5. A cache memory system as recited in claim 2, wherein said memory is dual ported.

6. A cache memory system as recited in claim 2, wherein said mass storage device is a disk drive.

7. A cache memory system as recited in claim 2, wherein said predetermined amount is equivalent to two sectors.

8. In a computer system including a main memory, a central processing unit CPU, one or more mass storage devices, a buffer and a cache memory, said CPU, main memory and cache memory being connected to a common bus, said buffer being connected between said one or more mass storage devices and said cache memory, a method of transferring requested data between said one or more mass storage devices and said main memory, the method comprising the steps of:

determining whether said requested data is within said cache memory;

transferring said requested data to said buffer from said mass storage device in a predetermined time period when said requested data is not within said cache memory;

transferring a portion of said requested data from said buffer to said cache memory within the same predetermined time period under predetermined conditions; and transferring a portion of said requested data from said cache memory to said main memory during the same predetermined time period.

9. A method as recited in claim 8, wherein said predetermined time period is substantially equivalent to the time period for said mass storage device to transfer a predetermined amount of data to said buffer.

* * * * *